Patented Feb. 21, 1950

2,498,338

UNITED STATES PATENT OFFICE 2,498,338

PRESSURE SENSITIVE ADHESIVE TAPE

John B. Martin, Glen Ellyn, Ill., assignor to The Kendall Company, Boston, Mass., a corporation of Massachusetts No Drawing. Application March 30, 1943, Serial No. 481,159

6 Claims. (Cl. 117—122)

This invention relates to pressure-sensitive adhesive sheet materials, and more particularly to surgical adhesive tapes.

Crude rubber has for many years been considered an indispensible ingredient of a successful surgical tape adhesive. When crude rubber is present in proper proportions, and proper formulation is observed, the crude rubber does impart to an adhesive those characteristics expected of a good quality surgical tape adhesive, and standards for surgical tape have been based, both officially and unofficially, upon the performance of adhesives which have about a 30% crude rubber content.

Thus, the 11th revision of the U. S. Pharmacopoeia currently in force sets forth the following standard for surgical tape rating:

"The plaster mass . . . must contain about 30 per cent of pure rubber."

The Federal Standard Stock Catalog, U-P-401, sec. IV (part 5) of June 30, 1936, also currently in force, provides:

"C–1a. Type I plaster, adhesive, surgical, shall be made of a cotton fabric backing, coated on one side with an adhesive mass containing not less than 30 percent of thoroughly washed, new rubber. . . ."

Both of these official standards illustrate the point that satisfactory surgical tape quality has been considered to be wholly dependent upon formulation with 30 percent pure rubber.

Now that the supply of crude rubber and even of reclaim rubber is problematical, the maintenance of standards derived from unlimited use of crude rubber has become an acute problem in the surgical tape field.

The main object of this invention is to provide an adhesive tape which conforms to the requirements necessary for classification as a surgical adhesive tape, but which will not be dependent in its adhesive formulation upon the use of crude or reclaim rubber. Since tapes made in accordance with this invention are suitable for surgical tape use even though a 30% crude rubber content is not present, it becomes necessary to define standards for determination of suitability for use as a surgical adhesive tape other than by crude rubber content. Such other standards have always heretofore been met in high quality 30% rubber content surgical adhesive tapes and are more critical than the mere rubber content standard. These other standards, aside from desirable commercial attributes relating to color, odor and skin irritability, are as follows:

1. Unrolling. First and foremost is the major requirement that the tape be capable of being unwound when rolled upon itself, in the absence of interliners, without ruinous separation or delamination of the adhesive mass through transfer of the mass to the underlying layer of the roll. This capability is imparted to an otherwise satisfactory adhesive by reason of an inherent elasticity in the mass which can be observed in a present-day 30% crude rubber type of surgical tape by the tendency of the mass to extend and snap back as it is unrolled from the underlying layer during the unrolling process.

2. Adhesion. As referred to in this application, adhesion is determined by laying a strip of the tape to be tested, 1 inch wide and of convenient length, tacky surface down upon a smooth surfaced Bakelite panel, under temperature conditions of 70° F. The panel is then placed in a 15° inclined position and a 7 lb. roller, which is free to move vertically, is passed over the strip at the rate of 1 foot per minute up and back to adhere the pressure-sensitive surface to the panel. One end of the strip is then attached to the clamp of a tensile strength Scott tester and the average number of pounds required to pull a substantial length of tape off the Bakelite surface at an approximate 180° angle and at a rate of 1 foot per minute is determined. A minimum adhesion for surgical tape use is an average of ¾ of a pound, and a desirable minimum adhesion is closer to 1¼ pounds.

This adhesion test is more critical than the adhesion test contained in the above referred to section of the Federal Standard Stock Catalog, paragraphs D–5 and F–2b, wherein the test involves a straight pull and not a 180° angle stripping.

3. Aging. Within the meaning of this specification, aging is determined by an accelerated test. This test is designed to simulate in one week the effects of a year's oxidation under decidedly adverse storage conditions. It comprises storage of the tape under 300 pounds oxygen pressure at 105° F. for a period of one week.

Thereafter the tape should still meet the minimums for adhesion and creep described in paragraphs 2 and 4 hereof, and be capable of satisfactory unrolling as described in paragraph 1.

4. Cohesion. This standard is determined by a creep test which involves laying a 1 inch strip of the tape of several inches length, tacky side of the tape of a horizontally disposed, raised, 1 inch diameter Bakelite cylinder, and suspending a 1 pound weight from each end of the tape. The apparatus is then placed in an oven at 105° F. for a period of fifteen minutes. The tape is then slashed across the top of the cylinder, the cylinder being provided with any necessary slot for permitting such slashing. The time required for either portion of the tape to fall from the cylinder represents the "creep" of the tape.

The minimum creep for the purposes of surgical tape is ten minutes, and preferably a tape should not separate from the cylinder in this test until after 25 or 30 minutes. As will be understood, a flypaper or other similar soft mass would, under the above test at 105° F., slide off the cylinder almost instantaneously.

In the production of surgical adhesive tapes in accordance with this invention, it is therefore contemplated that the tapes will conform to each and all of the above standards for unrolling, minimum adhesion, aging and cohesion.

Because crude rubber has heretofore been unrestrictedly available for industrial tape use as well as for surgical tape use, many industrial tapes have adhesives, following the practice established in the surgical tape field, formulated with the 30% crude rubber content. When bearing adhesives so formulated, industrial tapes may often conform to all the above surgical tape standards. On the other hand, it is widely recognized that standards for some industrial pressure-sensitive adhesive tapes may be much less strict than the standards pertaining to surgical tape. As a consequence, there have been suggested industrial tapes, the adhesives of which do not contain rubber. But with rubber omitted, the adhesives fail to meet all of the surgical tape standards above set forth, and such tapes, unfortunately, cannot be relied upon to give the performance of commercially known 30% rubber content surgical adhesive tapes.

For instance, for some industrial purposes, it is not necessary that the adhesive tape fulfill requirement 1. Such tapes need not be rolled upon themselves either during manufacture or merchandising. Under such circumstances, there is much wider latitude in the permissible choice of an adhesive than in the preparation of tapes which must, like surgical tape, fulfill requirement 1 as to unrolling. Some of the suggested non-rubber, pressure-sensitive adhesives are, therefore, described only in connection with the preparation of industrial sheets or tapes which are designed for packaging in flat sheet form, not roll form; or are designed for roll packaging only when faced with separator sheets or interliners.

Again, one of the important and frequent uses of surgical tape is in strapping injured body portions. Here the adhesive sheet is relied upon to give actual support to injured body parts, and maintenance of the desired support is directly dependent upon portions of the tape remaining anchored in the applied position, as prescribed by the skill of the physician during initial application. This quality is controlled by the creep of the tape. It should have a minimum of creep, that is, it should have sufficient grab and mass cohesion to maintain the sheet in proper position without undue tendency to slip relative to the surface to which it has been applied, and thus reduce such supporting tension as the physician may have chosen to use at the time of its application.

This quality of creep is very difficult to attain in the absence of the usual crude rubber contant, and, while pressure-sensitive adhesive tapes for industrial use, wherein the creep quality may not be so strict, may be formulated in the absence of a crude rubber content, prior to the invention of this application non-rubber adhesive tapes having a creep standard sufficient to permit their use in the field as a surgical tape have not been produced in conjunction with the ability to unroll.

Thus, it is believed it has not been even claimed that non-rubber adhesives could produce tapes which could be regarded as having the characteristics of, or as being useful as substitutes for, surgical tapes, or that they would possess qualities of creep, adhesion and aging equivalent to those found in the now widely known commercial 30% crude rubber pressure-sensitive adhesive surgical tapes.

Industrial tape adhesive formulae have also been suggested which have a smaller amount of rubber than that heretofore considered indispensable for surgical tape adhesives, namely, 25 to 30% crude rubber or equivalent percentage of rubber hydrocarbons. However, as is again to be expected, no claim is made that these tapes can be used as surgical adhesive tapes, obviously for the reason that the qualities imparted by the full modicum of rubber hydrocarbons, namely, at least 25 to 30%, upon which surgical tape standards are based, are lacking.

Despite availability of these suggestions pertaining to industrial tapes, until the development of the invention herein described, no formula brought to light by personnel long connected with the surgical tape adhesive art or by any representative of chemical houses contacted, has resulted in the production of an adhesive tape which could be classified as a surgical tape in the sense that it could approach doing the job in the field that present-day 25 to 30% crude rubber tapes do, in the absence of at least a 25 to 30% rubber hydrocarbon adhesive content. This invention produces such a tape.

The adhesives of this invention have as an essetial ingredient factice. Factice is a material prepared by the sulfurization of a variety of vegetable oils such as linseed, soy bean, corn and rapeseed oils. For the purposes of this invention, best results have thus far been secured with the use of a factice available on the market under the trade name "Amberex Type B," which is described by its manufacturer (Stamford Rubber Supply Co.) as a vulcanized vegetable oil containing no chlorine. It is believed that the vegetable oil is rapeseed oil. This particular factice is relatively insoluble in hydrocarbon solvents and it exhibits very little tensile strength per se.

The use of materials such as this factice has, because of many non-rubber-like properties, been highly restricted, even in the solid rubber goods industry. For adhesives, the material is naturally unsuitable. Because of its crumbly nature and inherent weakness, factice obviously has never been considered as an ingredient which could supply the basic film-forming and elastic qualities of a pressure-sensitive adhesive. Furthermore, being relatively insoluble in hydrocarbon solvents, it cannot be formulated for spreading by any method relying wholly upon the use of hydrocarbon solvents, and, because of its crumbly weakness, it cannot be sheeted on a rubber mill in the manner of rubber. In addition, then, to its physical deficiencies as an ingredient, by nature it could not heretofore be properly processed to form a useful base for a pressure-sensitive adhesive.

Factice, then, as used in the practice of this invention, is not a rubber substitute. It cannot be compounded into a successful pressure-sensitive adhesive in accordance with any of the usual rubber practices, and the results of this invention cannot be secured merely by applying rubber technique pressure-sensitive adhesive practices. On the contrary, factice requires a specialized handling which, if followed as taught by this invention, overcomes the disastrous results secured in any attempt to formulate factice in accordance with rubber practices.

A successful surgical adhesive tape of this invention may be made from the following ingredients:

*Example A*

|  | Parts | Per cent |
|---|---|---|
| Factice (Amberex B) | 5 | 21 |
| Resin (Hydrogenated glycerol abietate-acid number=10) | 11 | 47 |
| Zinc oxide | 4 | 17 |
| Plasticizer (lanolin) | 3.5 | 14 |
|  |  | 99 |

Proper compounding practice must be observed, an example of which is as follows:

The factice and resin are pulverized, mechanically mixed, and placed together on a cold rubber mill, and the mill roll heat is gradually brought up to and in excess of 230° F., preferably to 250° F., that is, well above the melting point of the resin, and milling is continued for a period of, say, 15–40 minutes, more or less, at which time the factice and resin finally become blended into a homogenous cohesive, plastic, calenderable and elastic composition. Apparently, the roasting of the factice at this elevated temperature increases the solubility of the factice in the resin; a chemical change of some sort may be indicated by the fact that noticeable evolution of gas has been observed to occur during such a milling operation. The temperature may then be dropped 50° F. or so, and the zinc oxide and lanolin ingredients may then be added and thoroughly milled into the factice-resin base. The cooling step is not, however, essential.

Such a mass may then be transferred from the mill directly to a three-roll calender for spreading a continuous, smooth coating of substantially uniform thickness, on a suitable backing material, such as cloth, in accordance with known practice, the adhesive being pressure-united as a preformed sheet to the backing. The calender roll temperature may be approximately the following:

|  | °F. |
|---|---|
| Top roll | 150 |
| Center roll | 105–120 |
| Bottom roll | 90 |

As an alternative procedure to roasting the factice in the presence of the resin on the mill, it is possible to roast the factice alone in the container by pulverizing the factice and heating to a temperature above 400° F. The heat-treated factice may then be placed on the mill for admixing therewith the other ingredients.

In connection with the above mass, it will be noticed that the resin specified is hydrogenated glycerol abietate. The choice of this particular resin is based upon the discovery that a successful pressure-sensitive adhesive of the above type containing zinc oxide can be made only when a relatively non-acidic resin is used, i. e. of low acid number. Ordinary wood rosin, or any other resin having a similarly high acid number, could not be successfully substituted in the above formula. If such substitution is attempted, the mass goes dead (i. e., becomes non-tacky and dry) in a very short time, apparently due to a reaction between the relatively highly acidic rosin and the zinc oxide. The occurrence of this undesirable reaction is not to be expected, because zinc oxide and wood rosin have been used together in the manufacture of rubber surgical tape adhesives for many years. For some obscure reason, the presence of the rubber in such heretofore manufactured adhesive has prevented the reaction or has, at least, prevented the appearance of the results of the reaction which do appear in the absence of the rubber.

For the purpose of this invention, therefore, relatively acidic resins and zinc oxide cannot be common ingredients in such proportion as to produce the undesirable results of this reaction. Of course, other low acid type resins may be used instead of hydrogenated glycerol abietate, such as other ester gums or cumaronindene resins.

In the adhesive thus far described, the zinc oxide acts in a manner similar to its action in usual rubber surgical adhesives; it is generally considered as a reinforcing filler which strengthens the cohesion of the mass by providing internal friction. However, its inclusion lessens the transparency of the adhesive. Where a more transparent adhesive is desired, perhaps for industrial use on a transparent cellophane backing, the zinc oxide may be omitted in accordance with the following formula, in which it is also to be noted that would wood rosin is called for, as it may be used in the absence of the zinc oxide, since there is then no danger of encountering the undesirable zinc oxide relatively acidic-resin reaction heretofore referred to:

*Example B*

|  | Parts | Per cent |
|---|---|---|
| Factice | 5 | 22 |
| Resin (wood rosin) | 10 | 44 |
| Plasticizer (lanolin) | 4.5 | 20 |
| Filler (starch) | 1.5 | 7 |
| Wax (paraffin) | 1 | 6 |
| Anti-oxidant | ¼ | 1 |

As is indicated, here the anti-oxidant is included in order to improve the aging quality by preventing oxidation of the wood rosin, which, from an aging standpoint, is materially inferior to that of the hydrogenated glycerol abietate. The omission of the anti-oxidant from the previous formula is permitted by reason of the fact that factice and hydrogenated glycerol abietate, unlike rosin, are not subject to serious oxidation; they are substantially non-oxidizable.

In the above-given formula the factice resin base is alone relied upon to give the necessary film-forming and elastic properties to the adhesive mass. It is also within the purview of this invention to modify the adhesives of the above-given formulae in the direction of greater cohesion and/or greater elasticity, by admixing with the factice-resin base a small proportion of suitable modifiers.

One such modification is the following, in which a different type of relatively non-acidic resin is used, and in which the modifier is a small proportion of a polyvinyl resin:

Example C

|  | Parts | Per cent |
|---|---|---|
| Factice (Amberex B) | 3 | 18 |
| Resin (Beckacite No. 2000—Beck Koller & Co.—phenolformaldehyde resin) | 6 | 35 |
| Polyvinyl resin (polyvinyl acetate) | 1 | 6 |
| Zinc oxide | 3 | 18 |
| Plasticizer (Santicizer No. 8—mixture of ortho and para toluene ethyl sulfonamides) | 4 | 24 |

This type of adhesive may be formulated and calendered in the same manner and with temperatures similar to those previously recited, the Santicizer acting as a softener or plasticizer, instead of the lanolin.

The naming of a polyvinyl resin is not meant to restrict the modifiers to those particular compounds, for other cohesion and/or elasticity modifiers of this general type, compatible with factice, such as ethyl cellulose or Advagum (a vulcanized polyterpene marketed by Advance Solvents & Chemical Corp.) may be used.

It is to be understood that crude or reclaim rubber, or any of the various types of synthetic rubber, need not be excluded from adhesives manufactured in accordance with this invention. They may be added to the factice-resin mixture either before, during or after the heat-treating period.

Where rubber is used, the proportions observed in the previously given formulae may be generally preserved, with the exception that the plasticizer constituent can be reduced about in proportion to the amount of crude rubber added, since the rubber has a plasticizing effect.

As examples, successful surgical adhesive tapes have been prepared in accordance with the first formula above given, where crude rubber is included in an amount of 10%, or where reclaim is included in an amount of 15%, with the lanolin being reduced in each case to approximately 1.25 parts, or about 5%. For reasons previously indicated, where a small amount of rubber is thus included, anti-oxidants for the rubber are desirable. If reclaim rubber is used, less reduction in the plasticizer content should be made, as reclaim averages only about a 50% rubber hydrocarbon content as against the 100% rubber hydrocarbon content of crude rubber.

In one sense the inclusion of 5%, 10%, 15% or even higher percentages of crude rubber, reclaim rubber or synthetic rubber represents a modification of the factice-base adhesive by the use of a plasticizer which also has elasticity and/or cohesion enhancing properties. Modification of factice-base adhesives with a small amount of synthetic or natural rubber is thus similar insofar as elastic and cohesive enhancement is concerned to modification of the factice-resin base with a polyvinyl resin, as set forth in a previous formula.

Insofar as plasticizing is concerned, reduction in plasticizer may be greater in the case of crude rubber than with synthetic rubber modifiers. In the case of crude rubber, the plasticizing effect of the small proportion of rubber on the factice base is so effective, that, for some purposes, the rubber constituent may be relied upon as the sole plasticizer. For example, where it is contemplated that an adhesive tape will be subjected to sterilization, the omission of a plasticizer other than rubber is helpful in preserving the desirable characteristics of the adhesive despite the sterilization heat. Omission of such plasticizer can be accomplished with the following formula:

Example D

|  | Parts | Per cent |
|---|---|---|
| Factice | 5 | 19 |
| Resin (hydrogenated glycerol abietate, acid number=10) | 11 | 43 |
| Zinc oxide | 6 | 23 |
| Rubber | 2.6 | 10 |
| Starch | 1 | 3 |

On the other hand, where the tougher synthetic rubbers are used the plasticizer is not so much reduced, and may have to be increased.

For instance, it has been found that the synthetic rubber, Buna S, which is the mixed-polymers-of-butadiene-and-styrene type, may be compounded with factice and appears to produce even greater cohesion than the same adhesives modified with an equal quantity of crude rubber. A satisfactory compounding of factice, Buna S and plasticizer is as follows:

Example E

|  | Parts | Per cent |
|---|---|---|
| Factice | 5 | 19 |
| Resin (hydrogenated glycerol abietate-Acid Number=10) | 11 | 43 |
| Zinc oxide | 5.0 | 18 |
| Plasticizer (lanolin) | 2.5 | 9 |
| Buna S (Hycar OS 20—Goodrich Tire & Rubber Co.) | 2.6 | 10 |
|  | 26.1 | 99 |

The compounding and calendering may follow above-described methods, with the Buna S being preliminarily milled and added on the cold mill to the factice-resin mixture.

Isobutylene polymer also belongs to this class of elasticity and cohesion modifiers and acts to improve these qualities when included in small proportion in a factice-base adhesive. In the case of the inclusion of isobutylene polymer in an amount up to about 12.5% of the mass, the plasticizer content is preferably increased in order to maintain the proper amount of tack, the isobutylene polymer being of tougher nature than the previously referred to natural and synthetic rubber. With such increase in plasticizer, the plasticizer also serves as a part of the resin constituent, and the resin ingredient may thus be reduced. A suitable formula is as follows:

Example F

|  | Parts | Per cent |
|---|---|---|
| Factice | 5 | 25 |
| Resin (hydrogenated glycerol abietate) | 2 | 10.5 |
| Zinc oxide | 5.5 | 27 |
| Plasticizer (mineral oil or Vis'ac) | 5 | 25 |
| Isobutylene Polymer (Vis'anex medium molecular weight—60,000-120,000) | 2.5 | 12.5 |

From the above description, it will be seen that in accordance with this invention satisfactory tapes can be prepared which have a zero rubber hydrocarbon content per square yard, or have any restricted amount of rubber hydrocarbon content per square yard desired, even though the tape has a uniform exposed normally tacky coating of 6 oz. of adhesive mass per square yard or more. Specifically, it is claimed that the foregoing invention provides for the first time a commercially acceptable one-coat surgical adhesive tape having a rubber hydrocarbon content of less than 1 oz. per square yard. A successful one-coat operation involves a minimum adhesive spread averaging from about 4½ to 7 oz. per square yard. In other words, for the first time a surgical adhesive tape is produced having less than 22.5% rubber hydrocarbons per square yard, as distinguished from the 25 to 30% rubber hydrocarbons heretofore always used. A reduction of rubber hydrocarbon content to 22.5% or below always caused tapes either to become soupy or flypapery and specifically incapable of meeting the creep test herein described, or else to become non-elastic to the extent of causing ruinous delamination in unwinding or use; a reduction to 5 or 10% rubber hydrocarbon content made the tape absolutely useless as a surgical tape.

A factice-base adhesive, as the term is herein used, indicates one in which the factice acts as the cohesion imparting ingredient, and is present in the absence of, or in predominance over, any crude or reclaim rubber, isobutylene polymer, or any other similar elastic, rubber-like material, whether synthetic or natural.

I claim:

1. A pressure sensitive adhesive tape comprising a flexible backing material bearing on a surface thereof a coating of a pressure sensitive adhesive consisting essentially of a modified factice composition comprising a mixture of a halogen-free curved vegetable oil factice and a solid rubbery material selected from the group consisting of natural rubber, reclaim rubber, isobutylene polymer of molecular weight 60,000–120,000, and butadiene-styrene copolymer, a tackifying resin and a liquid plasticizer, both said tackifying resin and said liquid plasticizer being compatible with said modified factice composition, said composition and ingredients being present in substantially the following amounts by weight of said adhesive: modified factice composition—from 14 to 40%, of which the factice constitutes from 14 to 25%, tackifying resin—from 10 to 50% and liquid plasticizer—from 5 to 25%.

2. A pressure sensitive adhesive tape comprising a flexible backing material bearing on a surface thereof a coating of a pressure sensitive adhesive consisting essentially of a modified factice composition comprising a mixture of a halogen-free cured vegetable oil factice and a solid rubbery material selected from the group consisting of natural rubber, reclaim rubber, isobutylene polymer of molecular weight 60,000–120,000, and butadiene-styrene copolymer, a tackifying resin, a liquid plasticizer, and an inert reinforcing filler, both said tackifying resin and said liquid plasticizer being compatible with said modified factice composition, said composition and ingredients being present in substantially the following amounts by weight of said adhesive: modified factice composition—from 14 to 40%, of which the factice constitutes from 14 to 25%, tackifying resin—from 10 to 50%, liquid plasticizer—from 5 to 25% and inert reinforcing filler—at least 10%.

3. A pressure sensitive adhesive tape comprising a flexible backing material bearing on a surface thereof a coating of a pressure sensitive adhesive consisting essentially of a modified factice composition comprising a mixture of a halogen-free cured vegetable oil factice and a solid rubbery material selected from the group consisting of natural rubber, reclaim rubber, isobutylene polymer of molecular weight 60,000–120,000 and butadiene-styrene copolymer, and a resin composition selected from the group of solid-liquid mixtures consisting of solid rosin and liquid mineral oil, of solid rosin and liquid isobutylene polymer of molecular weight less than 60,000, of solid ester gum and liquid mineral oil, of solid ester gum and liquid isobutylene polymer of molecular weight less than 60,000, of solid cumarone-indene resin and liquid mineral oil, of solid cumarone-indene resin and liquid isobutylene polymer of molecular weight less than 60,000, said compositions and ingredients being present in the following amounts by weight of said adhesive: modified factice composition—from 14 to 40%, of which the factice constitutes from 14 to 25%; resin composition—from 35 to 64%, of which the solid constituent constitutes from 10 to 50% and the liquid constituent from 5 to 25%.

4. A pressure sensitive adhesive tape as claimed in claim 3 wherein the rubbery material is isobutylene polymer of molecular weight 60,000–120,000, and the resin composition is a mixture of solid hydrogenated glycerol abietate and liquid isobutylene polymer of molecular weight less than 60,000.

5. A pressure sensitive adhesive tape comprising a flexible backing material bearing on a surface thereof a coating of a pressure sensitive adhesive consisting essentially of a modified factice composition comprising a mixture of a halogen-free cured vegetable oil factice and a rubbery material selected from the group consisting of natural rubber, reclaim rubber, isobutylene polymer of molecular weight 60,000–120,000 and butadiene-styrene copolymer, and a resin-filler composition selected from the group of solid-liquid-filler mixtures consisting of solid ester gum, liquid mineral oil and zinc oxide, of solid ester gum, liquid isobutylene polymer of molecular weight less than 60,000 and zinc oxide, of cumarone-indene resin, liquid mineral oil and zinc oxide, of solid cumarone-indene resin, liquid isobutylene polymer of molecular weight less than 60,000 and zinc oxide, said compositions and ingredients being present in the following amounts by weight of said adhesive: modified factice composition—from 14 to 40%, of which the factice constitutes from 14 to 25%; resin-filler composition—from 62.5% to 78%, of which the solid resin constituent constitutes from 10 to 50%, the liquid constituent from 5 to 25% and the filler from 10 to 27.5%

6. A pressure sensitive adhesive tape as claimed in claim 5, wherein the rubbery material is isobutylene polymer of molecular weight 60,000–120,000 and the resin-filler composition is a mixture of solid hydrogenated glycerol abietate, liquid isobutylene polymer of molecular weight less than 60,000 and zinc oxide.

JOHN B. MARTIN.

REFERENCES CITED

The following references are of record in the file of this patent:

UNITED STATES PATENTS

| Number | Name | Date |
|---|---|---|
| 152,742 | Goetsh et al. | July 7, 1874 |
| 310,957 | Muirhead | Jan. 20, 1885 |

(Other references on following page)

| Number | UNITED STATES PATENTS Name | Date |
|---|---|---|
| 1,262,302 | Boecking | Apr. 9, 1918 |
| 1,376,173 | Snelling | Apr. 26, 1921 |
| 1,735,480 | Talalay | Nov. 12, 1929 |
| 1,744,602 | Yoshiota | Jan. 21, 1930 |
| 1,753,018 | Owen | Apr. 1, 1930 |
| 1,892,123 | Zimmerli et al. | Dec. 27, 1932 |
| 1,932,361 | Freydberg | Oct. 24, 1933 |
| 1,938,011 | Foldini | Dec. 5, 1933 |
| 2,054,283 | Ellis | Sept. 15, 1936 |
| 2,115,448 | Pradt | Apr. 26, 1938 |
| 2,203,677 | Drew | June 11, 1940 |
| 2,235,536 | Savage et al. | Mar. 18, 1941 |
| 2,243,386 | Lewis | May 27, 1941 |
| 2,382,284 | Bencowitz | Aug. 14, 1945 |

FOREIGN PATENTS

| Number | Country | Date |
|---|---|---|
| 754,446 | France | Nov. 7, 1933 |

OTHER REFERENCES

Duprene Manual, pages 36–41, Aug. 1 1934. (Copy in Div. 50.)

Ellis, "Chemistry of Synthetic Resins," vol. I, pages 485 and 486, vol. II, pages 1210–1212. (Copy in Div. 38.)